July 16, 1940.  F. CARTLIDGE  2,208,269
CONVEYER
Original Filed Oct. 29, 1936  6 Sheets-Sheet 2
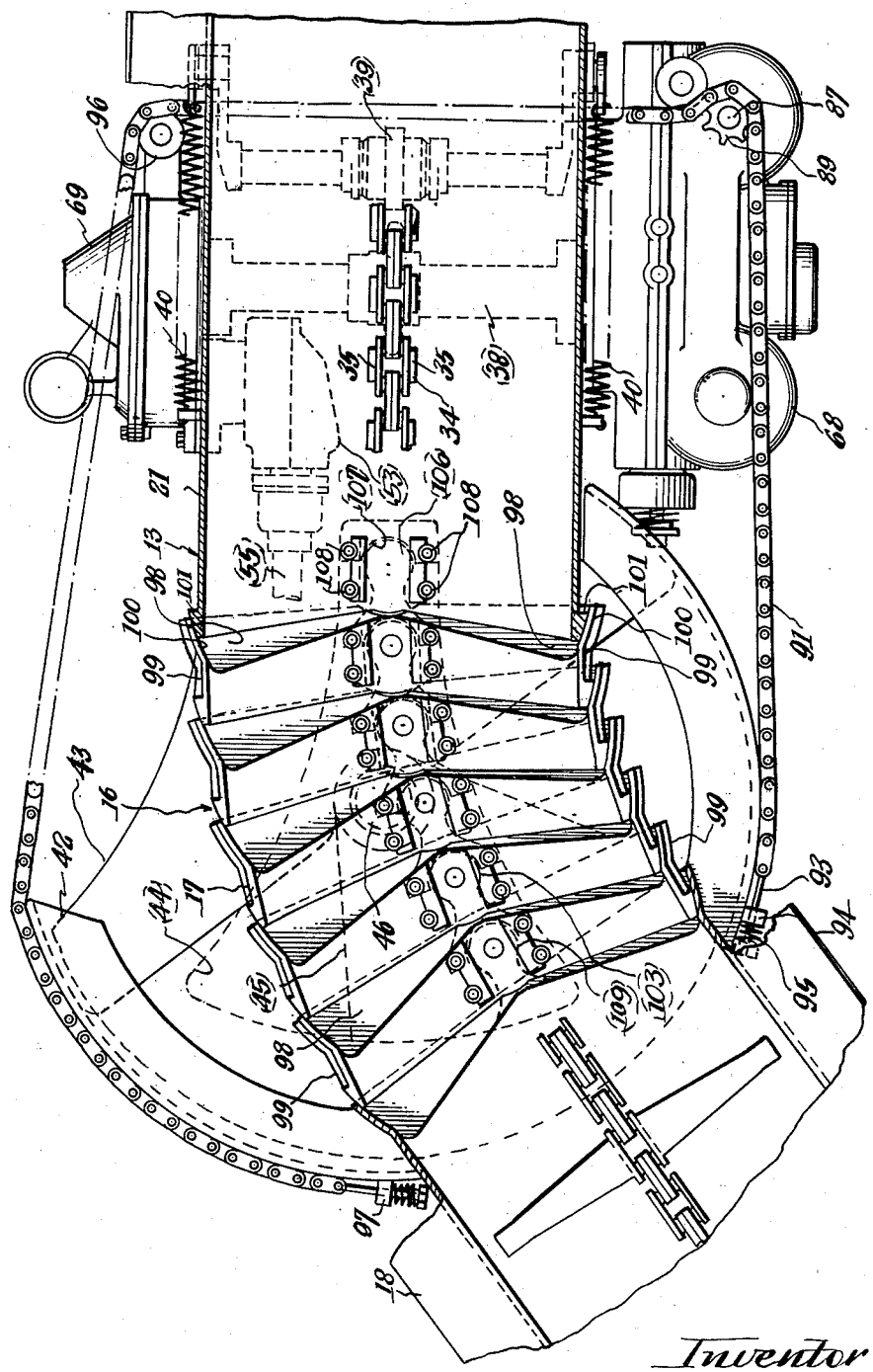
Inventor
Frank Cartlidge
Clarence F. Poole
Attorney July 16, 1940.  F. CARTLIDGE  2,208,269
CONVEYER
Original Filed Oct. 29, 1936   6 Sheets-Sheet 3
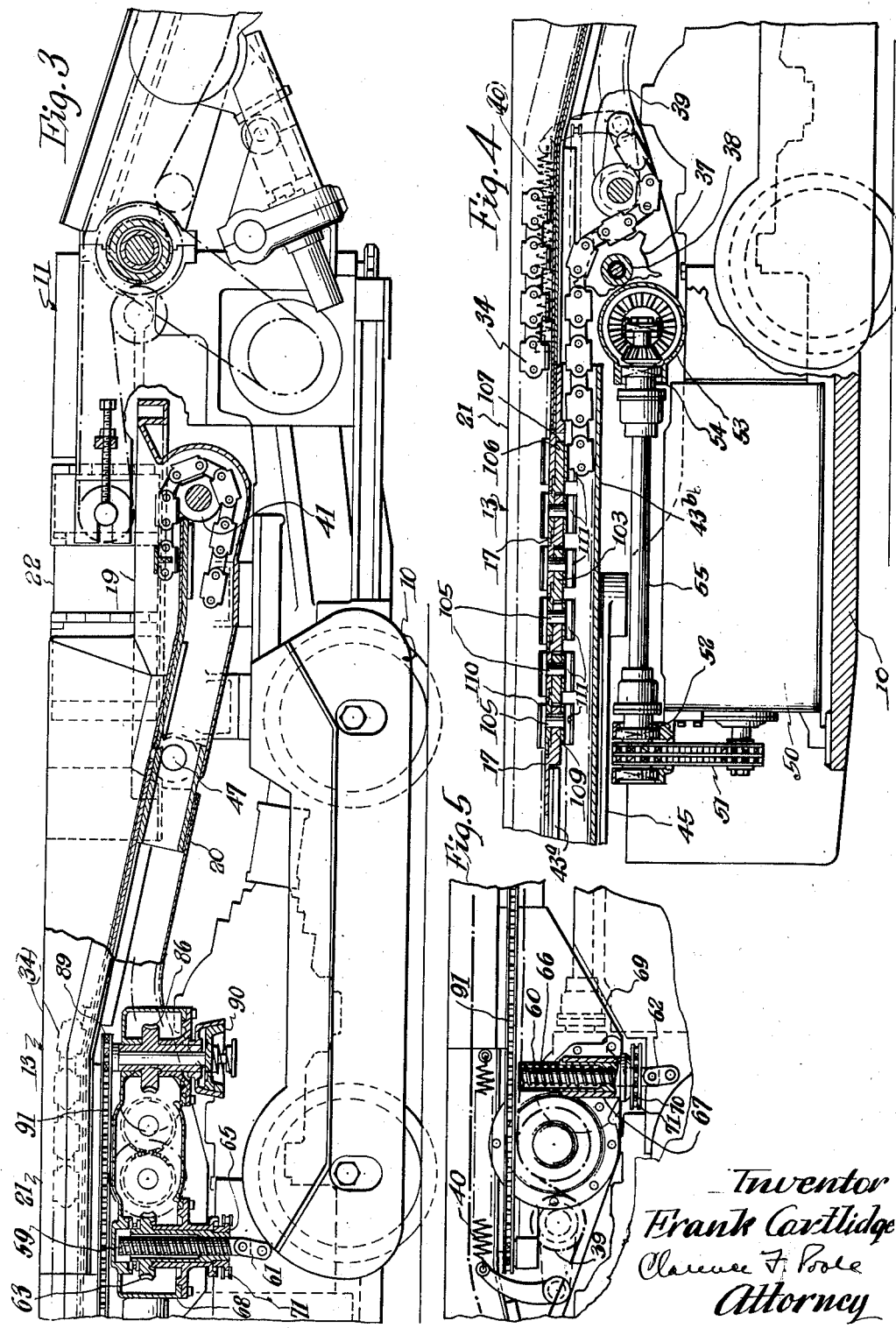
Inventor
Frank Cartlidge
Clarence F. Poole
Attorney

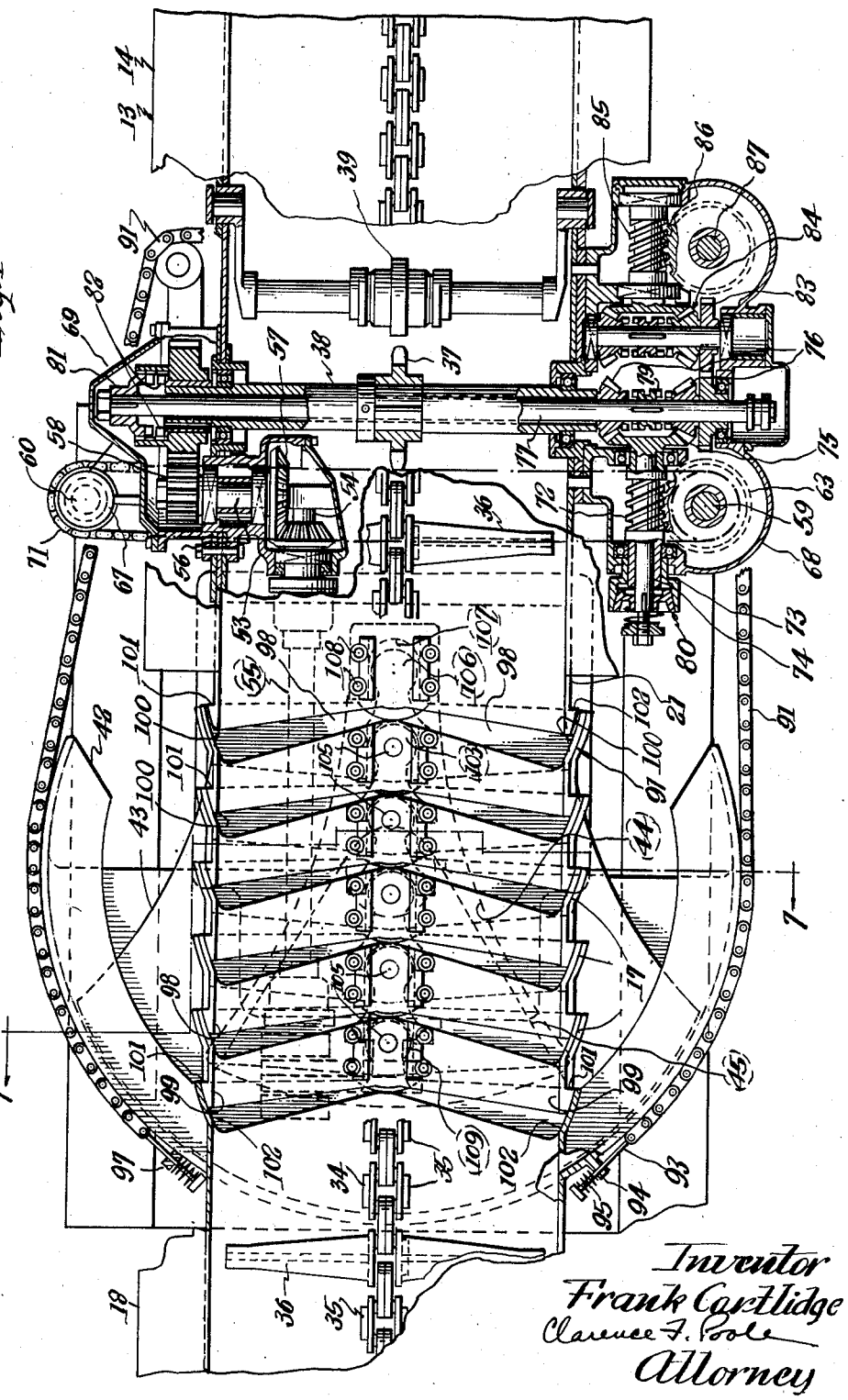

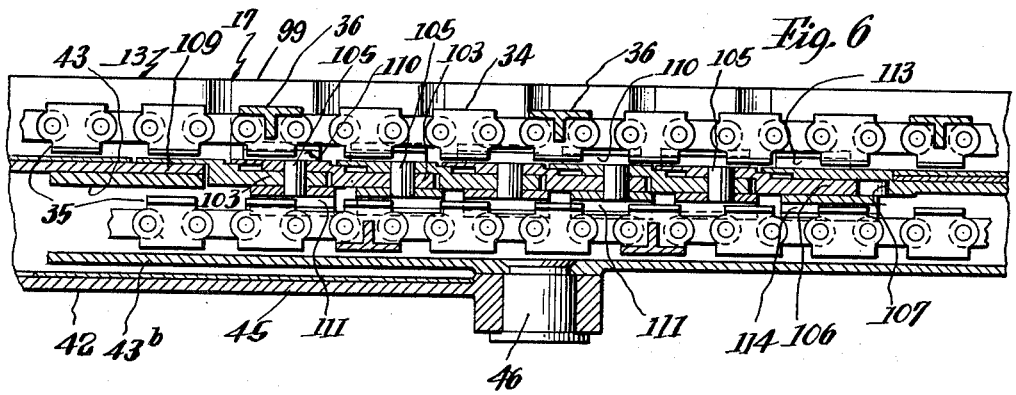
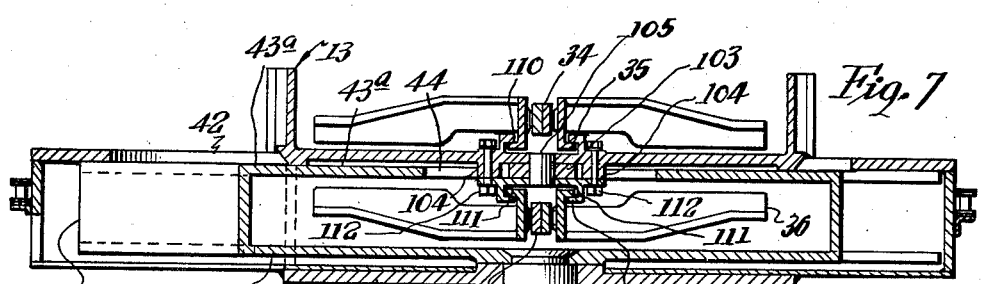
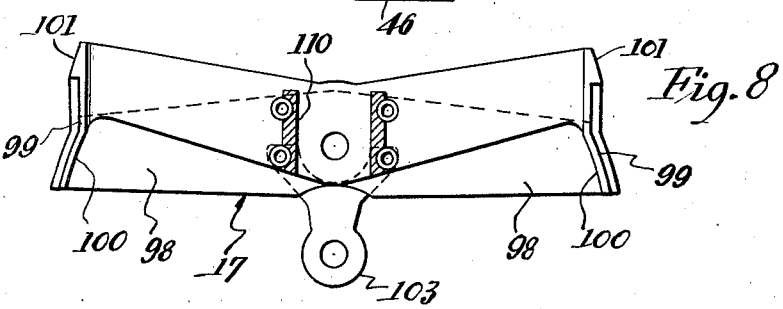

July 16, 1940.  F. CARTLIDGE  2,208,269
CONVEYER
Original Filed Oct. 29, 1936   6 Sheets-Sheet 5
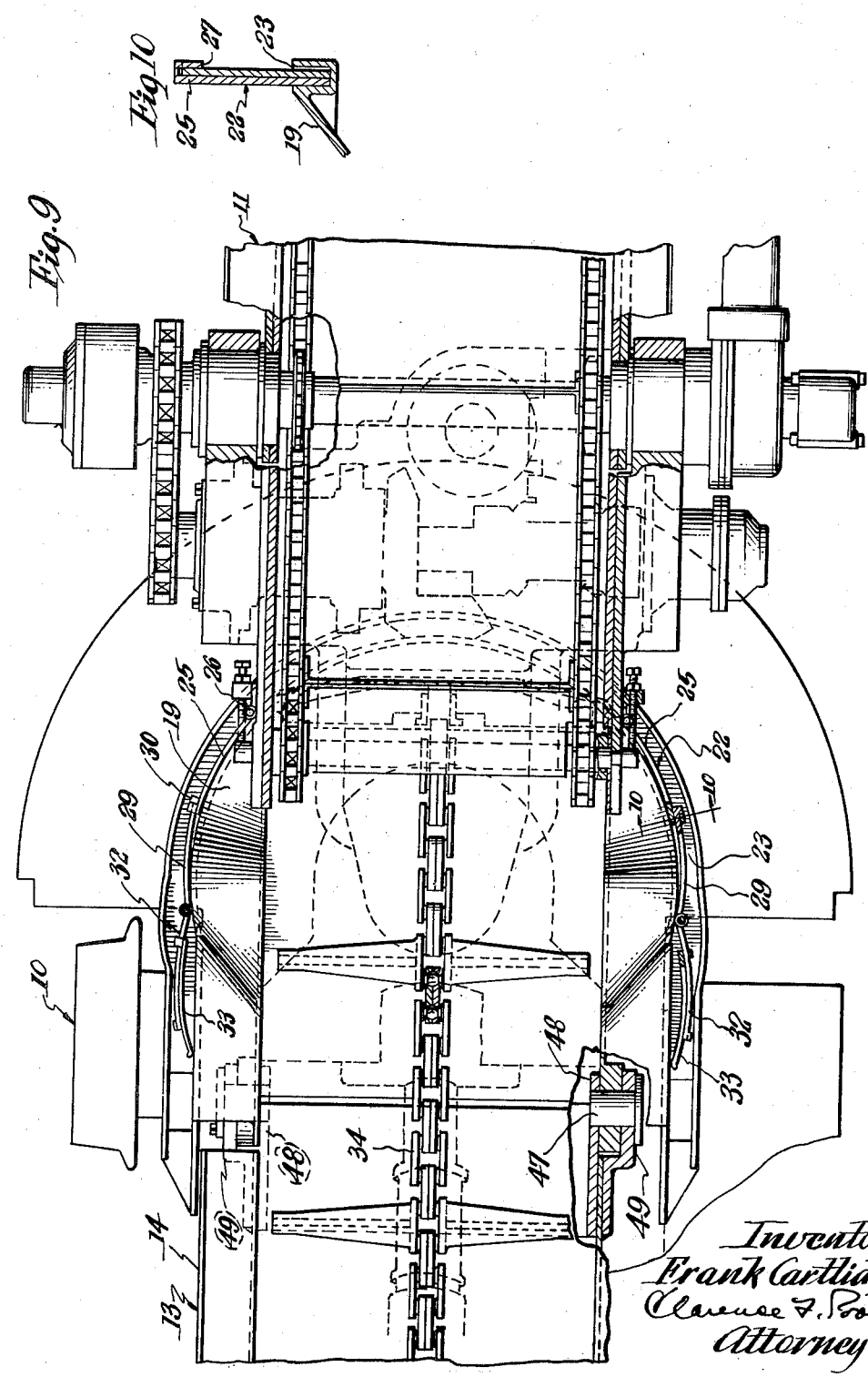

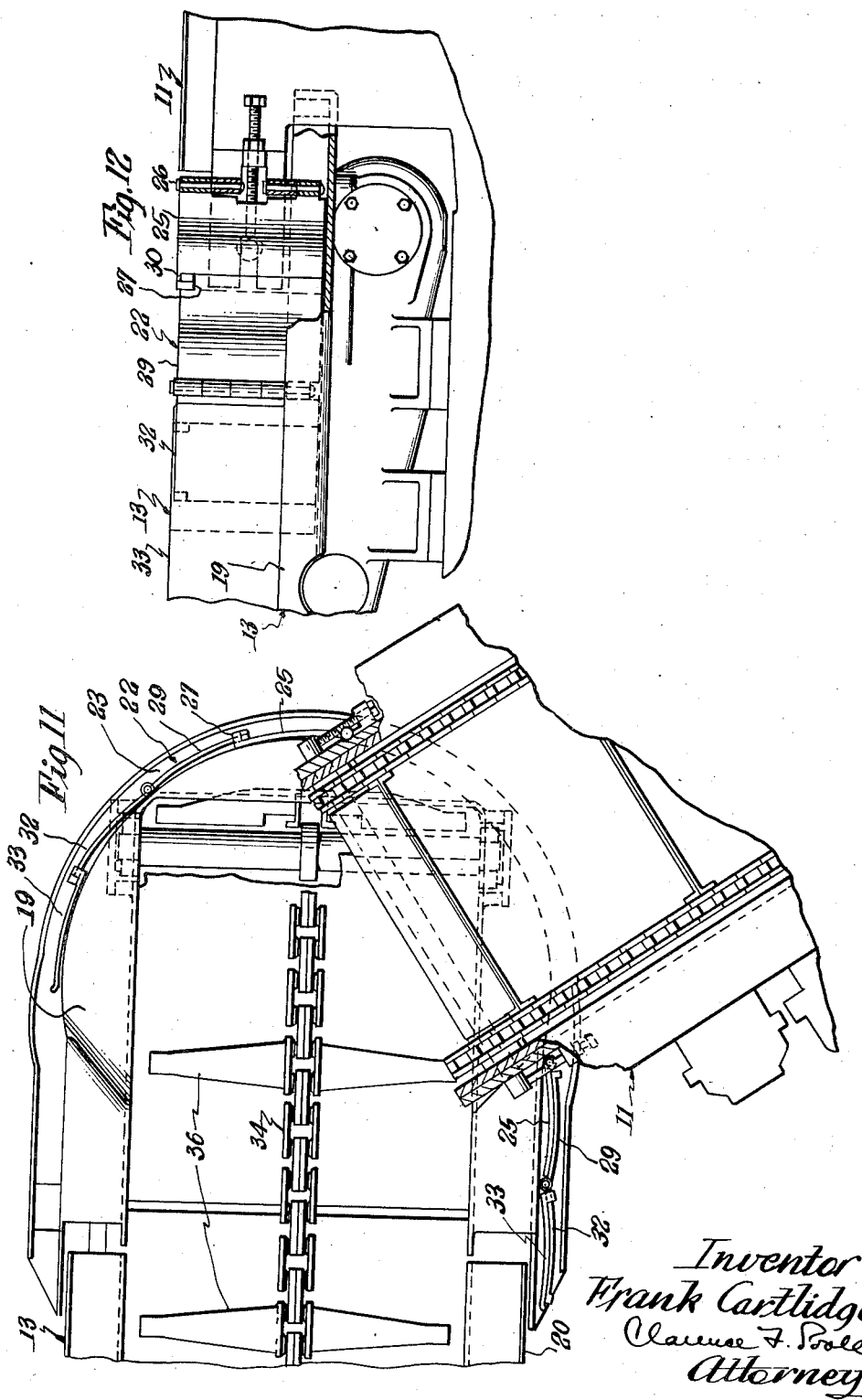

Patented July 16, 1940

2,208,269

UNITED STATES PATENT OFFICE 2,208,269

CONVEYER

Frank Cartlidge, Chicago, Ill., assignor to Goodman Manufacturing Company, Chicago, Ill., a corporation of Illinois Application October 29, 1936, Serial No. 108,189
Renewed December 14, 1939

24 Claims. (Cl. 198—109)

This invention relates to improvements in conveyers and more particularly to improvements in conveyers adapted for use with loading machines of the type operable in confined spaces such as coal mines.

Among the objects of my invention are to provide an articlulated conveyer having a continuous trough from one end to the other when its discharge end is moving with respect to its receiving end so that material may be discharged therefrom in any position of articulation, which conveyer is so arranged as to be of a more efficient construction than has heretofore been provided.

Other objects of my invention will appear from time to time as the accompanying specification proceeds.

My invention may be more clearly understood with reference to the accompanying drawings wherein:

Figure 1 is a fragmentary plan view of a conveyer constructed in accordance with my invention, and shown as being incorporated in a loading machine, with parts of the conveyer broken away and shown in section;

Figure 2 is a fragmentary plan view of the conveyer with the discharge end swung to one side of the machine frame;

Figure 3 is a fragmentary view in side elevation of the device shown in Figure 1 with parts of the conveyer and adjusting mechanism therefor shown in longitudinal section;

Figure 4 is an enlarged fragmentary view in side elevation of the machine shown in Figure 1 with certain other parts shown in longitudinal section than are shown in Figure 3 in order to more clearly illustrate certain details of the drive to the conveyer;

Figure 5 is an enlarged detail view illustrating the mechanism for vertically adjusting the tail end of the conveyer;

Figure 6 is a fragmentary sectional view showing certain parts of the conveyer in longitudinal section;

Figure 7 is a sectional view taken substantially along line 7—7 of Figure 1;

Figure 8 is an enlarged detail plan view of one of the trough segments of the conveyer;

Figure 9 is an enlarged fragmentary plan view of the forward portion of the machine illustrating certain details of the hopper construction at the forward end of the conveyer;

Figure 10 is a sectional view taken substantially along line 10—10 of Figure 9;

Figure 11 is an enlarged fragmentary plan view of the forward portion of the machine with the elevating conveyer shown in a different position than in Figure 9; and Figure 12 is an enlarged detail view in side elevation illustrating certain details of the hopper not shown in Figures 9, 10 and 11.

In the drawings, the embodiment of my invention illustrated is herein shown as being incorporated in a loading machine of the track mounted type which is particularly adapted for use in gathering and loading coal in mines. Said machine is constructed along lines somewhat similar to those illustrated in a prior Patent No. 2,027,091, issued January 7, 1936, so will not herein be shown or described in detail, and includes generally a track mounted truck 10 having an elevating conveyer 11 projecting forwardly from the forward end thereof and pivotally movable with respect thereto about both horizontal and vertical axes. Said elevating conveyer is provided with a suitable gathering and loading element at its forward end (not shown) which is adapted to gather and move material onto said elevating conveyer for discharge into a discharge conveyer 13 extending longitudinally of the machine.

The discharge conveyer 13 includes a forward trough section 14 having a forward end thereof in the form of a hopper to receive material discharged by the elevating conveyer 11, an intermediate trough section 16 which consists of a plurality of articulated trough segments 17, 17, and a discharge trough section 18 mounted for swinging movement with respect to said forward section in a horizontal plane so that material may be discharged into a car when the machine is operating around a curve, or may be discharged at various desired points to one side or the other of the machine.

The forward trough section 14 of the discharge conveyer 13 extends along and, as herein shown, is rigidly mounted in the frame for the truck 10 in a suitable manner. Said trough section consists of a hopper 19 disposed beneath the discharge end of the elevating conveyer 11, an inclined portion 20 extending longitudinally angularly upwardly therefrom and mounted so as to be vertically movable about a transverse axis (in a manner which will hereinafter more clearly appear as this specification proceeds), and a relatively horizontal rear end portion 21. (See Figure 3.)

The hopper 19 of the discharge conveyer 13 is provided with extensible upright side walls 22, 22 slidably mounted therein to increase the depth of said hopper. Said side walls are pivotally connected to opposite sides of the rear end portion of the elevating conveyer 11 to follow said conveyer as it is swung from side to side of the machine. As herein shown, said hopper is provided with an integrally formed channeled guide 23 extending along its periphery and along the sides thereof which is adapted to have the extensible side walls 22, 22 slidably guided therein. (See Figures 9, 10 and 11.)

Each extensible side wall 22 consists of a curved plate 25 pivotally secured to one side of the elevating conveyer 11 by means of hinge pins 26, 26. A guide 27 is formed at the upper outer side of said plate which slidably engages a curved plate 29. A stop 30 is provided on the end of said last mentioned curved plate to prevent disconnection of said plates upon pivotal movement of the elevating conveyer. A plate 32 is in turn hinged to the curved plate 29 and is slidably guided in a curved plate 33. The radius of curvature of said plates is such that when the elevating conveyer is turning to one extreme position or another the frictional resistance between the curved walls on one side of the conveyer and the guide 23 will telescope said wall, and the side plates on the opposite side of the conveyer will be extended to follow said conveyer due to frictional resistance of said side walls against said guide, so that said side plate arrangement will form in effect a hopper which is telescopic in the direction the elevating conveyer is swinging.

An endless conveyer chain 34 is guided for movement along the central portion of the discharge conveyer 13 and moves in a closed path above and below the trough sections thereof. As herein shown, said endless chain is of the gibbed type having gibs 35, 35 extending laterally from the lower side thereof and adapted to be guided in the articulated trough segments 17, 17. Said chain is flexible in a lateral direction so it may conform to the form of the discharge trough section when in various positions of articulation. Lateral flexibility of said endless chain is effected by providing ball and socket connections between adjacent links of said chain in a usual manner and illustrated in detail in Figure 9.

The conveyer chain 34 has flights 36, 36 projecting laterally from opposite sides thereof at suitable intervals therealong and extends forwardly of the machine beneath the discharge trough section 18 from a suitable idler sprocket or roller (not shown) at the rear end of said discharge trough section to and over a drive sprocket 37 on a transversely extending hollow shaft 38. Said shaft is mounted in the inclined frame section 20 for movement therewith. (See Figures 1 and 4.) From said drive sprocket said chain extends under a tension roller 39. Said tension roller maintains tension on said chain by means of a tension spring 40 which engages said roller with said chain by means of a suitable system of levers not described in detail since it is no part of my present invention. Said chain extends forwardly from said tension roller to and around a direction changing roller 41 at the forward end of the forward trough section 14. From thence said chain extends rearwardly along the upper side of said conveyer trough sections to the rear end thereof.

The tail or discharge trough section 18 of the conveyer 13 is mounted on a frame 42 which has an outer periphery of an arcuate formation and has a shouldered under portion conforming to the form of the outer periphery of said frame. Said shouldered under portion slidably engages and is mounted on a support frame 43. Said support frame is secured to and extends rearwardly from the forward trough section 14 and is of a fan-like formation in plan view, with an arcuate rear face which engages the shouldered portion of the frame 43 and forms a support therefor. Said frame is hollow so the chain 34 may pass therethrough and has an upper side 43a and a lower side 43b spaced therefrom in parallel relation with respect thereto. An opening 44 of a fan-like formation is provided in the upper surface 43a of said support frame to permit the lower portion of the articulated trough segments 17 to extend therethrough and form a guide for the lower run of the chain 34 in a manner which will more clearly appear as this specification proceeds.

The discharge trough section 18 is supported for horizontal pivotal movement with respect to the receiving portion of the conveyer about a vertical axis spaced rearwardly of the forward end of said forward trough section by means of the frame 42 which has an arm 45 extending inwardly from the rear end thereof beneath the frame member 43. Said arm is pivotally mounted at its inner end on the under side 43b of said frame member by means of a depending pivotal pin 46. (See Figures 4, 6 and 7.)

The inclined portion 20 of the forward section 14 of the discharge conveyer 13 is hinged directly to the rear of the hopper portion thereof to permit said conveyer to be accommodated to varying heights of mine cars, by means of hinge pins 47, 47. Said hinge pins extend through the sides of said hopper section and members 48, 48 and 49, 49 extending forwardly from the sides of the section 20 and interleaving the sides of said hopper section. (See Figure 9.)

The drive sprocket 37 and conveyer are driven from a motor 50 on the truck 10. The drive from said motor to said sprocket includes a double chain and sprocket drive 51 driven from the rearward end of the shaft for said motor which drives a longitudinally extending shaft 52. (See Figure 4.) A gear housing and support frame 53 is secured to one side of the horizontal portion 21 of the forward trough section 14 and extends inwardly therefrom beneath said trough section and has a shaft 54 journaled therein. (See Figures 1 and 4.) Said shaft is driven from the shaft 52 by means of a universal extensible drive connection, generally indicated by reference character 55, to permit driving of the discharge conveyer when it is pivotally moved in a vertical direction to effect adjustment of the rearward end thereof. A transverse shaft 56 is driven from the shaft 54 by means of a bevel gear train 57. Said shaft in turn drives the parallel hollow shaft 38 by means of a spur gear train indicated by reference character 58.

Means are provided for elevating the discharge end of said conveyer by power, which as herein shown comprise adjusting screws 59 and 60, each of which is mounted on one side of the trough section 14 and pivotally secured to the frame of the truck 10 by means of links 61 and 62 respectively. The adjusting screw 59 is threaded within the hub of a worm gear 63, which worm gear in turn is journaled in and held from translational movement with respect to a housing and support frame member 69 projecting from the side of the conveyer frame which is its right hand side when looking towards the receiving end thereof. A sprocket 65 is keyed to the lower end of the hub of the worm gear 63. The adjusting screw 60 on the opposite side of the machine is threaded within a threaded sleeve 66 journaled in and held from translational rotation with respect to a hollow boss 67. (See Figures 1 and 5.) Said boss in turn is a part of a housing and support frame 69 which is secured to the opposite side of the forward trough section 14 from the housing 64. A sprocket 70 is keyed on the lower end of said threaded sleeve and is driven from the sprocket 65 by means of an endless drive chain 71. Thus rotation of the worm gear 63 will pivot the discharge conveyer about the axes of the hinge pins 47, 47 to elevate or lower the discharge end thereof.

The worm gear 63 is driven from a worm 72 on a sleeve 73 which is freely mounted on and coaxial with a longitudinally extending shaft 74. A bevel gear 75 is mounted on the forward end of said shaft and is adapted to be meshed with opposing bevel pinions 76, 76 freely mounted on a transverse shaft 77 coaxial with and extending through the hollow shaft 38. Either one of the bevel pinions 76 is selectively connected with the shaft 77 for reversing the direction of rotation of the shaft 74 without reversing the direction of rotation of said transverse shaft by means of a suitable jaw clutch member 79. The shaft 74 is operatively connected with the sleeve 73 by means of a suitable friction cone overload clutch 80 adapted to slip upon a predetermined load on said sleeve. Said clutch is of an ordinary construction so is not herein shown or described in detail. The shaft 77 is selectively connected with the spur gear train 58 by means of a suitable jaw clutch member 81 keyed to the end of said shaft adjacent said gear and adapted to selectively mesh with jaws 82, 82 extending outwardly from the gear of said gear train which is coaxial with said shaft. Said clutch member is shifted by means of a suitable system of levers (not shown) which moves the shaft 77 translationally with respect to the hollow shaft 38.

The discharge end of the conveyer 13 is selectively swung from side to side by power by means of a suitable reverse gear train driven from the transverse shaft 77. Said gear train includes a spur gear train 83 and a reverse bevel gear train 84 which drives a worm 85 which meshes with a worm gear 86. Said worm gear is journaled in the housing 68 and has a hollow hub which has a shaft 87 mounted therein, the upper end of which shaft has a sprocket 89 secured thereto. Said shaft is connected with said worm gear so as to be driven therefrom by means of a suitable overload friction slip clutch generally indicated by reference character 90. (See Figure 3.)

A drive chain 91 is yieldably connected at one of its ends to the frame 42 adjacent one side of the trough section 18 by means of a rod 93, which extends through a lug 94 projecting from said frame, and which has a compression spring 95 interposed between a head on the end of said rod and said lug. Said chain extends forwardly from said lug along the outer surface of said frame member to and around the sprocket 89. From thence it extends transversely across said frame, around a roller 96 and rearwardly therefrom to a lug 97 adjacent the opposite side of said discharge trough section. The end of said chain is yieldably secured to said lug in a manner similar to which its opposite end is yieldably secured to the lug 94. (See Figure 2.) Thus, when the worm gear 86 is driven in one direction or another through the reverse gearing 84, the discharge section of the conveyer will be swung to one side or the other of the truck 10 by means of the chain 91.

Referring now particularly to the novel form of articulated trough construction between the forward and discharge sections of the conveyer 13, each articulated intermediate trough segment 17 has recessed forward portions 98, 98 on opposite sides of the upper surface of its bottom. (See Figure 8.) Said recessed portions are adapted to have the rear end portion of the trough section 14 nested therein in the case of the first of said segments (see Figures 1 and 2) and have the rear portion of the next adjacent segment nested therein in the case of the succeeding segments. Each trough segment is also provided with upright side walls 99, 99 having an inner forward engaging surface 100 of a convex formation which is adapted to engage a concave formation 101 on the rearward end of each side wall of the next adjacent trough segment, or a concave formation 102 on the forward end of the trough section 18 in the case of the first of said segments. A drilled tongue 103 extends forwardly from each segment 17 and is adapted to extend within a groove formed by depending side walls 104 of the next adjacent trough section 17 and be pivotally connected to said trough segment by means of a pivotal pin 105. (See Figure 7.)

The forwardmost trough segment 17 is provided with a tongue 106 which is similar to the tongues 103, 103 with the exception that it is not drilled. Said tongue fits in an elongated socket 107 and is pivotally and longitudinally movable with respect thereto. Said socket is disposed beneath the rear end of the horizontal portion 21 of the forward trough section 14 and is secured thereto by means of nuts and bolts 108, 108. A tongue 109 projects forwardly from the forward end of the discharge trough section 18 and is pivotally connected to the rearwardmost trough section 18 in a manner similar to which the trough segments 17 are connected together.

A gibbed guide 110 is herein shown as being formed integral with the top surface of the trough segment 17 and extending longitudinally along the central portion thereof. In a like manner, a gibbed guide 111 is disposed in alignment with the guide 110 but is disposed beneath and depends from said segment. Said last mentioned gibbed guide abuts the under surface of the depending side walls 104 and is secured thereto by means of suitable nuts and bolts 112, 112 extending through said side walls. (See Figure 7.) Likewise a gibbed guide 113 is provided at the rear of the horizontal portion 21 of the trough section 14 and a corresponding guide 114 is disposed beneath the socket 107, and secured to the under surface thereof by means of the nuts and bolts 108, 108. (See Figures 1, 2 and 6.)

From the foregoing it may be seen that since each trough segment is capable of a certain amount of pivotal movement with respect to the other that the discharge section 18 may be turned at an angle which is the sum of the angles of movement of each articulated segment and that a continuous articulated trough is thus provided from the forward to the rearward end of said discharge conveyer. It may also be seen that during articulation of the conveyer the upper run of the chain 34 is guided in the gibbed guides 106 to conform to the angular relationship of said intermediate sections with respect to said discharge section and that the lower run of said chain is guided in the gibbed guides 107 which extend within the frame member 43 through the fan-shaped opening 44.

It may thus be seen that the construction of the discharge conveyer is such as to permit turning movement thereof without increasing the height of the machine, in a novel and efficient manner, and that said conveyer is so arranged as to eliminate all gaps between the forward and the rearward trough sections and guide the chain to readily follow the curved form of the intermediate portion of the discharge conveyer.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a conveyer, two spaced apart trough sections, one of which is supported for movement with respect to the other in a horizontal plane about a fixed axis spaced from said movable trough section and disposed adjacent said other trough section, a conveyer extending along said trough sections, and means interposed between said trough sections for connecting said trough sections together comprising a plurality of intermediate trough segments having interengaging side walls.

2. In a conveyer, two spaced apart trough sections, one of which is supported for movement with respect to the other in a horizontal plane about an axis disposed within the limits of said other trough section, a conveyer extending along said trough sections, and means interposed between said trough sections for connecting said trough sections together comprising a plurality of intermediate trough segments having interengaging side walls, said intermediate trough segments being pivotally connected together and having pivotal connection with adjacent ends of said end trough sections.

3. In a conveyer, two spaced apart trough sections one of which is supported for movement with respect to the other in a horizontal plane about a fixed axis spaced from said movable trough section and disposed adjacent said other trough section, a conveyer extending along said trough sections, and means interposed between said trough sections for connecting said trough sections together and forming a continuous closed trough when said trough sections are in various positions of adjustment with respect to each other and comprising a plurality of interconnected intermediate trough segments having interengaging side walls, one of said segments having slidable and pivotal connection with one of said adjoining trough sections.

4. In an articulated conveyer, two spaced apart trough sections, one of which is supported for swinging movement with respect to the other in a horizontal plane, a continuous conveying element movable along both of said trough sections, and means for connecting said trough sections together to form a continuous trough for said conveying element when said trough sections are disposed in various angular relations with respect to each other including a plurality of intermediate trough segments, said segments being pivotally connected together adjacent the longitudinal center of said conveyer and having oppositely disposed side walls which form extensible and retractible side wall connections between said trough sections.

5. In a conveyer, two trough sections, one of which is spaced from and is angularly movable with respect to the other in a horizontal plane about an axis fixed with respect to said other trough section, and means interposed between said trough sections for connecting said trough sections together and forming a continuous closed trough when said trough sections are in various positions of adjustment with respect to each other comprising a plurality of intermediate trough segments having interengaging side walls, said intermediate trough segments being pivotally connected together, one of said segments having slidable and pivotal connection with one of said adjoining trough sections and one of said other segments having pivotal connection with said other trough section, and the sides of said segments having slidable engagement with each other and with said trough sections.

6. In a conveyer, two trough sections, one of which is spaced from and is angularly movable with respect to the other in a horizontal plane about an axis fixed with respect to said other trough section, and means interposed between said trough sections for connecting said trough sections together and forming a continuous closed trough comprising a plurality of intermediate trough segments pivotally connected together and having interengaging side walls, said side walls having arcuately formed surfaces so that the inside of one side wall may engage the outside of the next adjacent side wall and so that the side walls of said segments next adjacent to said trough section may have continuous sliding contact with said trough sections.

7. In an articulated conveyer, a trough section, another trough section spaced from said first-mentioned trough section and being angularly movable with respect thereto about an axis fixed with respect to said first-mentioned trough section, an endless chain having flights spaced at intervals therealong, movable along said trough sections, and means interposed between said trough sections for guiding said endless chain when said trough sections are in various positions of adjustment with respect to each other and closing the gap between said trough sections comprising a plurality of intermediate trough segments having interengaging side walls and having guides extending along said segments for guiding said chain from one trough section to the other.

8. In an articulated conveyer, a trough section, another trough section spaced from said first-mentioned trough section and being angularly movable with respect thereto in a horizontal plane and about an axis fixed with respect to said first mentioned trough section, an endless chain flexible in a lateral direction movable along said trough sections, said endless chain having spaced apart flights thereon, and means interposed between said trough sections for guiding said endless chain when said trough sections are in various positions of adjustment with respect to each other and closing the gap between said trough sections comprising a plurality of intermediate trough segments pivotally connected together, each of said segments being provided with a guide for guiding said chain from one trough section to the other.

9. In an articulated conveyer, a trough section, another trough section spaced from said first-mentioned trough section and being angularly movable with respect thereto in a horizontal plane and about an axis fixed with respect to said first mentioned trough section, an endless chain flexible in a lateral direction movable along the central portion of said trough sections, said endless chain having spaced apart flights extending laterally therefrom in opposite directions, and means interposed between said trough sections for guiding said endless chain as it moves along said trough sections and forming a continuous closed trough when one of said trough sections is moved with respect to the other comprising a plurality of intermediate trough segments pivotally connected together and to adjacent ends of said trough sections, said trough segments having interengaging side walls and having guides extending along the central portion thereof.

10. In an articulated conveyer, a trough section, another trough section spaced from said first-mentioned trough section and being angularly movable with respect thereto in a horizontal plane and about an axis fixed with respect to said first mentioned trough section, an endless chain flexible in a lateral direction movable along the central portion of said trough sections, said endless chain having spaced apart flights extending laterally therefrom in opposite directions, and means interposed between said trough sections for guiding said endless chain as it moves along said trough sections and forming a continuous closed trough from one end of one trough section to the other end of the other comprising a plurality of intermediate trough segments pivotally connected together and to adjacent ends of said trough sections, said trough segments having guides extending along the central portion thereof to form a continuous guide for said chain, and the sides of said segments having slidable engagement with each other and with adjacent ends of said trough sections.

11. In an articulated conveyer, a trough section, another trough section spaced from said first-mentioned trough section and being angularly movable with respect thereto in a horizontal plane and about an axis fixed with respect to said first mentioned trough section, an endless chain flexible in a lateral direction movable along the central portion of said trough sections, said endless chain having spaced apart flights extending laterally therefrom in opposite directions, and means interposed between said trough sections for guiding said endless chain as it moves along said trough sections and forming a continuous closed trough from one end of one trough section to the other end of the other comprising a plurality of intermediate trough segments pivotally connected together and to adjacent ends of said trough sections, said trough segments having guides extending along the central portion thereof to form a continuous guide for said chain, and the sides of said segments having arcuately formed surfaces so the inside of one side wall may engage the outside of the next adjacent side wall and so that the side walls of said segments next adjacent to said trough sections may have continuous sliding contact therewith.

12. In an articulated conveyer, a trough section, a support frame mounted for pivotal movement with respect to said trough section about a vertical axis, another trough section spaced from said first-mentioned trough section and mounted on said support frame for horizontal swinging movement therewith, a flight conveyer extending along said trough sections, and means interposed between said trough sections and slidably supported on said frame for connecting said trough sections together when in various positions of adjustment with respect to each other comprising a plurality of trough segments pivotally connected together and interposed between said trough sections.

13. In an articulated conveyer, a trough section, a support frame, another trough section spaced from said first-mentioned trough section and mounted on said support frame for horizontal swinging movement with respect to said first mentioned trough section, and means interposed between said trough sections and slidably supported on said frame for closing the gap between said trough sections when in various positions of adjustment with respect to each other comprising a plurality of trough segments pivotally connected together and pivotally connected with adjacent ends of said trough sections, and having interengaging side walls slidably engaging the side walls of said trough sections.

14. In an articulated conveyer, a trough section, a support frame, another trough section spaced from said first-mentioned trough section and mounted on said supported frame for horizontal swinging movement about a vertical axis spaced from the end of said first mentioned trough section, and means interposed between said trough sections for connecting said trough sections together to form a continuous conveyer from one end of one trough section to the opposite end of the other trough section comprising a plurality of trough segments supported on said frame for lateral sliding movement with respect thereto, said segments having side walls formed to slidably engage each other and adjacent ends of said trough sections in all positions of articulation of said conveyer.

15. In an articulated conveyer, a trough section, a support frame, another trough section spaced from said first-mentioned trough section and mounted on said support frame for horizontal swinging movement about a vertical axis spaced from the end of said first mentioned trough section, and means interposed between said trough sections for connecting said trough sections together to form a continuous conveyer from one end of one trough section to the opposite end of the other trough section comprising a plurality of trough segments supported on said frame for lateral sliding movement with respect thereto, said segments being pivotally connected together and having pivotal connection with an end of one of said trough sections and slidable pivotal connection with an end of said other trough section, and the side walls of said segments being provided with arcuate formations to slidably engage each other and adjacent ends of said trough sections in all positions of articulation of said conveyer.

16. In an articulated conveyer, a trough section, a support frame, another frame mounted on said first mentioned frame for angular movement with respect thereto, a trough section mounted on said second mentioned frame for movement therewith, and means interposed between said trough sections for connecting said trough sections together to form a continuous conveyer from one end of one section to the other end of the other section comprising a plurality of intermediate pivotally connected trough segments slidably supported on said first mentioned trough section and having side walls slidably engaging each other and slidably engaging adjacent ends of said trough sections.

17. In an articulated conveyer, a trough section, a support frame, another trough section spaced from said first-mentioned trough section and mounted on said support frame for horizontal swinging movement with respect to said first mentioned trough section, an endless conveyer chain movable longitudinally along the central portion of said trough sections, and means for guiding said chain from one trough section to the other comprising a plurality of guides interposed between said trough sections and articulated with respect to each other.

18. In an articulated conveyer, a trough section, a support frame, another trough section mounted on said support frame for horizontal swinging movement with respect to said first mentioned trough section, an endless conveyer chain movable longitudinally along the central portion of said trough sections, and means for guiding said chain from one trough section to the other and closing the gap between said trough sections comprising a plurality of articulated trough segments interposed between said trough sections, said trough segments having guides for said chain extending along the central portion thereof and having interengaging side walls slidably engaging adjacent ends of said trough sections.

19. In an articulated conveyer, a trough section, a support frame, another trough section mounted on said support frame for horizontal swinging movement with respect to said first mentioned trough section, an endless conveyer chain movable longitudinally along the central portion of said trough sections, and means for closing the gap between said trough sections comprising a plurality of articulated trough segments having interengaging side walls slidably engaging adjacent ends of said trough sections, each of said segments having gibbed guides extending along the upper and lower sides thereof for guiding the upper and lower runs of said chain in all positions of articulation of said conveyer.

20. In a loading machine of the character described, a truck, an inclined elevating conveyer projecting forwardly of the forward end of said truck and pivotally mounted thereon for movement about a vertical axis, a discharge conveyer disposed beneath the rear end of said elevating conveyer and spaced therefrom, and extensible side walls interposed between said conveyers to retain material on said discharge conveyer when said elevating conveyer is laterally displaced with respect thereto including a plurality of plate sections pivotally connected to opposite sides of said elevating conveyer, said sections being slidable along the sides of said discharge conveyer and being telescopic with respect to each other.

21. In a loading machine of the character described, a track-mounted truck, an inclined elevating conveyer projecting forwardly of the forward end of said truck and pivotally mounted thereon for movement about a vertical axis, a discharge conveyer spaced beneath the rear end of said elevating conveyer and extending rearwardly beyond the rear end of said truck, the forward end of said discharge conveyer being of a hopper-like formation conforming to the path of movement of said elevating conveyer, and extensible side walls pivotally connected to said elevating conveyer and guided for movement along the outer side of said hopper for retaining material on said discharge conveyer when said elevating conveyer is laterally displaced with respect thereto.

22. In a loading machine of the character described, a track-mounted truck, an inclined elevating conveyer projecting forwardly of the forward end of said truck and pivotally mounted thereon for movement about a vetrical axis, a discharge conveyer spaced beneath the rear end of said elevating conveyer and extending rearwardly beyond the rear end of said truck, the forward end of said discharge conveyer being of a hopper-like formation conforming to the path of movement of said elevating conveyer, and an extensible side wall connection between said conveyers to retain material on said discharge conveyer when said elevating conveyer is laterally displaced with respect thereto including a channeled guide extending along the periphery of said hopper and a plurality of plate sections pivotally connected to opposite sides of said elevating conveyer and guided for movement in said guide, each set of said plates being telescopic with respect to each other and being so formed with respect to said channeled guide that movement of said elevating conveyer in one direction will telescope one set of said plates and extend the other by frictional resistance of said plates against said channeled guide.

23. In a loading machine of the character described, a truck, an inclined elevating conveyer projecting forwardly of the forward end of said truck and pivotally mounted thereon for movement about a vertical axis, a discharge conveyer spaced beneath the rear end of said elevating conveyer and extending rearwardly beyond the rear end of said truck, the forward end of said discharge conveyer being of a hopper-like formation conforming to the path of movement of said elevating conveyer, and an extensible side wall connection between said conveyers to retain material on said discharge conveyer when said elevating conveyer is laterally displaced with respect thereto including a channeled guide extending along the periphery of said hopper and a plate section pivotally connected to each side of said discharge conveyer, other plate sections telescopically movable with respect to said first-mentioned plate section, third plate sections pivotally connected to said last-mentioned plate sections, and fourth plate sections mounted for telescopic movement with respect to said last-named plate sections, said plate sections being so formed with respect to said channeled guide that movement of said elevating conveyer in one direction will cause one set of said plates to telescope and the other set of said plates to extend due to frictional resistance of said plates against said channeled guide.

24. In a loading machine of the character described, a track-mounted truck, an inclined elevating conveyer projecting forwardly of the forward end of said truck and pivotally mounted thereon for movement about a vertical axis, a discharge conveyer spaced beneath the rear end of said elevating conveyer and extending rearwardly beyond the rear end of said truck, the forward end of said discharge conveyer being of a hopper-like formation conforming to the path of movement of said elevating conveyer, and an extensible side wall connection between said conveyers to retain material on said discharge conveyer when said elevating conveyer is laterally displaced with respect thereto including a channeled guide extending along the periphery of said hopper and a plate section pivotally connected to each side of said discharge conveyer, other plate sections telescopically movable with respect to said first-mentioned plate sections, third plate sections pivotally connected to said last-mentioned plate sections, and fourth plate sections telescopically movable with respect to said last-named plate sections, said plate sections being of a curved formation conforming substantially to the form of said guide around said hopper, and said guide straightening out at its ends and extending along said discharge conveyer and being so formed with respect to said plates that movement of said elevating conveyer in one direction will telescope one set of said plates and extend the other set by engagement of said plates with said channeled guide.

FRANK CARTLIDGE.